(12) United States Patent
Kim et al.

(10) Patent No.: US 9,859,559 B2
(45) Date of Patent: Jan. 2, 2018

(54) LITHIUM ION CONDUCTOR, AND SOLID ELECTROLYTE, ACTIVE MATERIAL, AND LITHIUM BATTERY EACH INCLUDING THE LITHIUM ION CONDUCTOR

(71) Applicant: Samsung Electronics Co., Ltd., Suwon-si, Gyeonggi-do (KR)

(72) Inventors: Tae-young Kim, Seoul (KR); Young-sin Park, Suwon-si (KR); Seung-wook Baek, Hwaseong-si (KR); Jae-myung Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1008 days.

(21) Appl. No.: 13/938,373

(22) Filed: Jul. 10, 2013

(65) Prior Publication Data

US 2014/0017576 A1    Jan. 16, 2014

(30) Foreign Application Priority Data

Jul. 11, 2012 (KR) .................. 10-2012-0075749

(51) Int. Cl.
| | |
|---|---|
| *H01M 4/58* | (2010.01) |
| *H01M 6/16* | (2006.01) |
| *H01M 10/0525* | (2010.01) |
| *H01M 10/056* | (2010.01) |
| *H01M 4/13* | (2010.01) |
| *H01M 4/62* | (2006.01) |
| *H01M 10/052* | (2010.01) |

(Continued)

(52) U.S. Cl.
CPC .......... *H01M 4/5825* (2013.01); *H01M 4/13* (2013.01); *H01M 4/62* (2013.01); *H01M 6/168* (2013.01); *H01M 6/185* (2013.01); *H01M 10/052* (2013.01); *H01M 10/056* (2013.01); *H01M 10/0525* (2013.01); *H01M 10/0562* (2013.01); *H01M 10/0566* (2013.01); *H01M 12/08* (2013.01); *H01M 4/366* (2013.01); *H01M 12/06* (2013.01); *H01M 2300/0068* (2013.01); *Y02E 60/128* (2013.01)

(58) Field of Classification Search
CPC .............................. H01M 200/0065–200/0082
See application file for complete search history.

(56) References Cited

U.S. PATENT DOCUMENTS

| | | | |
|---|---|---|---|
| 2003/0190527 A1 | 10/2003 | Pugh et al. | |
| 2006/0257737 A1* | 11/2006 | Goh ..................... | H01M 4/131 429/209 |
| 2013/0122376 A1* | 5/2013 | Yokoyama ........ | H01M 10/0562 429/305 |

FOREIGN PATENT DOCUMENTS

| | | |
|---|---|---|
| CN | 001913045 A | 2/2007 |
| CN | 101707241 A | 5/2010 |

OTHER PUBLICATIONS

Aono Hiromichi et al., "Ionic Conductivity of Solid Electrolytes Based on Lithium Titanium Phosphate", J. Electrochem. Soc., vol. 137, No. 4, Apr. 1990, pp. 1023-1027.

(Continued)

*Primary Examiner* — Stephan Essex
(74) *Attorney, Agent, or Firm* — Cantor Colburn LLP

(57) ABSTRACT

A lithium ion conductor represented by Formula 1:

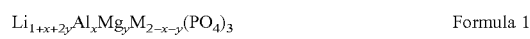

$$Li_{1+x+2y}Al_xMg_yM_{2-x-y}(PO_4)_3 \quad \text{Formula 1}$$

wherein, in Formula 1, M includes at least one of titanium (Ti), germanium (Ge), zirconium (Zr), hafnium (Hf), and tin (Sn), $0<x<0.6$, and $0<y<0.2$.

16 Claims, 8 Drawing Sheets

(51) Int. Cl.
*H01M 10/0562* (2010.01)
*H01M 10/0566* (2010.01)
*H01M 6/18* (2006.01)
*H01M 12/08* (2006.01)
*H01M 4/36* (2006.01)
*H01M 12/06* (2006.01)

(56) References Cited

OTHER PUBLICATIONS

Aono et al., "Ionic Conductivity and Sinterability of Lithium Titanium Phosphate System", Solid State Ionics, 40/41, 1990, pp. 38-42.

\* cited by examiner

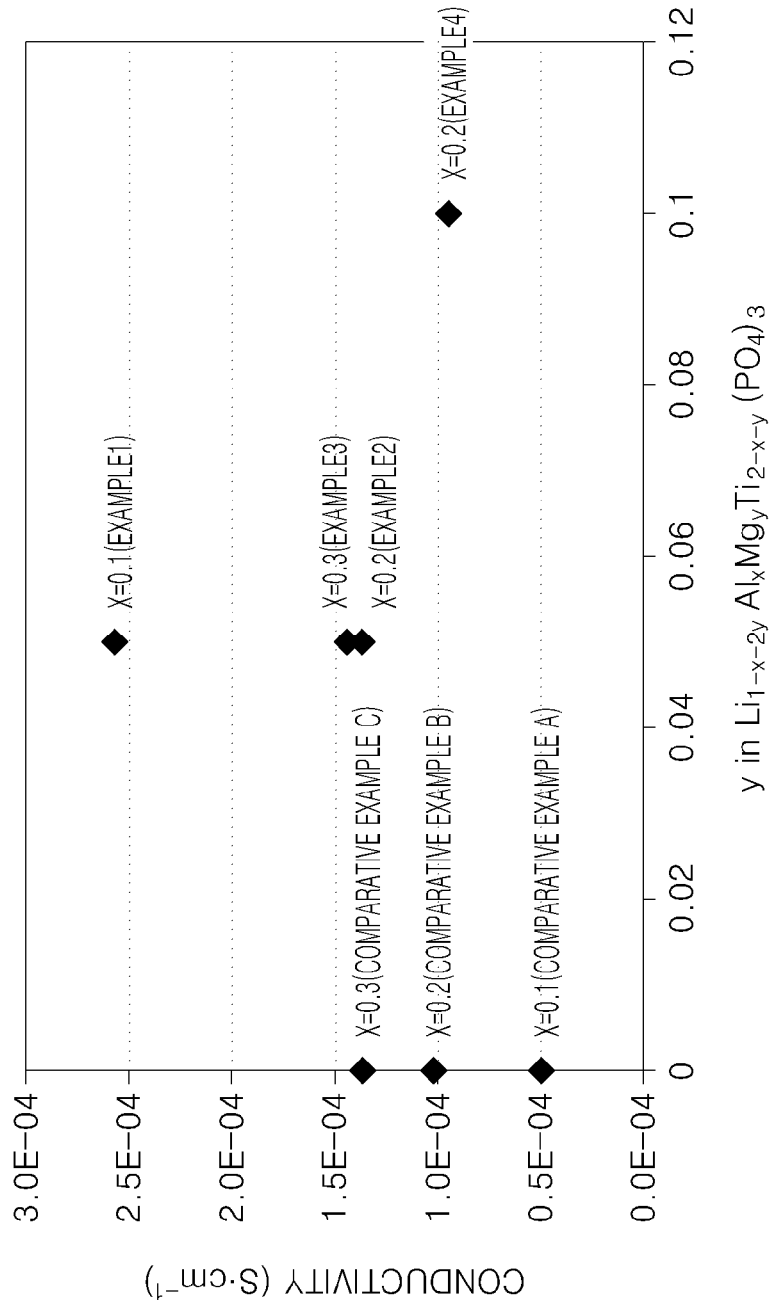

FIG. 7B

Lattice constants are
a = 8.51844(28)Å  b = a   c = 28.8528(9)Å
Alpha = 90   Beta = 90   Gamma = 120
Cell volume = 1818.38(7) Å³

| Name | x | y | z | Ui/Ue*100 | Site sym | Mult | Type | Seq | Fractn |
|---|---|---|---|---|---|---|---|---|---|
| Li1 | 0.000000 | 0.000000 | 0.000000 | 2.38 | -3 | 6 | Li | 1 | 1.0000 |
| Ti1 | 0.000000 | 0.000000 | 0.139624 | 0.59 | 3 | 12 | Ti | 2 | 0.3281 |
| P1 | 0.292260 | 0.000000 | 0.250000 | 0.13 | 2(100) | 18 | P | 3 | 1.0000 |
| O1 | 0.185424 | 0.995532 | 0.189366 | 0.99 | 1 | 36 | O | 4 | 1.0000 |
| O2 | 0.190204 | 0.165290 | 0.081305 | 0.39 | 1 | 36 | O | 5 | 1.0000 |
| Al1 | 0.000000 | 0.000000 | 0.139624 | 0.59 | 3 | 12 | Al | 6 | 0.1437 |
| Li2 | 0.548187 | 0.000000 | 0.250000 | 2.38 | 2(100) | 18 | Li | 7 | 0.1631 |
| Mg0 | 0.000000 | 0.000000 | 0.139624 | 0.59 | 3 | 12 | Mg | 8 | 0.0028 |
| Ti9 | 0.000000 | 0.000000 | 0.139624 | 0.59 | 3 | 12 | Ti | 9 | 0.4508 |

LITHIUM ION CONDUCTOR, AND SOLID ELECTROLYTE, ACTIVE MATERIAL, AND LITHIUM BATTERY EACH INCLUDING THE LITHIUM ION CONDUCTOR

CROSS-REFERENCE TO RELATED APPLICATIONS

This application claims priority to and the benefit of Korean Patent Application No. 10-2012-0075749, filed on Jul. 11, 2012, and all the benefits accruing therefrom under 35 U.S.C. §119, the content of which is incorporated herein by reference.

BACKGROUND

1. Field

The present disclosure relates to a lithium ion conductor, a solid electrolyte, and an active material, and a lithium battery, each including the lithium ion conductor.

2. Description of the Related Art

Lithium batteries are able to convert chemical energy generated from moving lithium ions to electrical energy. Lithium ion batteries have a vast range of applications as power sources for small portable devices, such as mobile phones and laptops, to medium to large devices, such as electric vehicles and large storage batteries.

Lithium batteries may be classified into either lithium primary batteries that are not reusable once discharged due to irreversible reactions, and lithium secondary batteries that are reusable via charging and discharging due to reversible reactions. Lithium batteries may also be classified as either non-aqueous lithium batteries, which use a liquid electrolyte containing a lithium salt in an organic solvent, or an all-solid-state lithium battery including solid components, such as a solid-state electrolyte, such as an inorganic solid electrolyte, and solid-state electrodes.

Recently, lithium batteries are increasingly being used as power sources for medium to large-sized devices, raising concerns of improved energy density and safety of the lithium battery. In this regard, all-solid-state lithium batteries are free from a risk of ignition or explosion caused by leakage of a liquid component of the battery, and may suppress or prevent growth of dendrite, self-discharging, and over-heating. For these reasons, all-solid-state lithium batteries are considered as a promising battery technology due to their improved safety.

Nonetheless, to improve the performance of such all-solid-state batteries, there is a demand for a solid electrolyte that has high conductivity and allows sufficient control of an interfacial reaction with an electrode of the all-solid-state battery.

SUMMARY

Provided are a lithium ion conductor having a new composition, and an electrolyte, an active material, and a lithium battery each including the lithium ion conductor, and methods of manufacturing the foregoing.

Additional aspects will be set forth in part in the description which follows and, in part, will be apparent from the description.

According to an aspect, there is provided a lithium ion conductor represented by Formula 1:

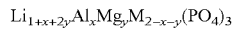

Formula 1 wherein, in Formula 1, M includes at least one of titanium (Ti), germanium (Ge), zirconium (Zr), hafnium (Hf), and tin (Sn), and $0<x<0.6$, and $0<y<0.2$.

In Formula 1, M may include at least one of titanium (Ti) and germanium (Ge).

In Formula 1, M may have an oxidation number of 4.

In Formula 1, x may be in the range of $0<x<0.3$.

In Formula 1, y may be in the range of $0<y\leq0.1$, for example, $0<y\leq0.05$.

In the lithium ion conductor of Formula 1, the aluminum (Al) and the magnesium (Mg) may be substituted at M site of the lithium ion conductor of Formula 1.

According to another aspect, a solid electrolyte includes the lithium ion conductor.

According to another aspect, an electrode active material for a lithium battery includes: a core including a material capable of intercalating and deintercalating lithium ions; and a shell disposed on at least a portion of a surface of the core; wherein the shell includes the lithium ion conductor.

According to another aspect, an all-solid-state lithium battery includes: a cathode including a cathode active material; an anode including an anode active material; and a solid electrolyte including the lithium ion conductor.

At least one of the cathode and the anode may further include the lithium ion conductor.

According to another aspect, a lithium battery includes: a cathode including a cathode active material; an anode including an anode active material; and an organic electrolyte solution, wherein at least one of the cathode, the anode, and the organic electrolyte solution includes the lithium ion conductor.

The lithium ion conductor may be disposed in the cathode, and the cathode may have a layered structure including a cathode current collector, a cathode active material layer including the cathode active material, and a protective layer including the lithium ion conductor, wherein the cathode current collector, the cathode active material layer, and the protective layer are disposed sequentially upon one another.

The lithium ion conductor may be disposed in the cathode, and the cathode active material may include: a core including a material capable of intercalating and deintercalating lithium ions; and a shell disposed on at least a portion of a surface of the core, wherein the lithium ion conductor may be disposed in the shell.

The lithium ion conductor may be disposed in the anode, and the anode may have a layered structure including an anode current collector, an anode active material layer including the anode active material, and a protective layer including the lithium ion conductor, wherein the anode current collector, the anode active material layer, and the protective layer are disposed are disposed sequentially upon one another.

The lithium ion conductor may be disposed in the anode, and the anode active material may include: a core including a material capable of intercalating and deintercalating lithium ions; and a shell disposed on at least a portion of a surface of the core, wherein the lithium ion conductor may be disposed in the shell.

According to another aspect, a lithium air battery includes: a cathode including at least one of an oxygen-oxidation catalyst and an oxygen-reduction catalyst; an anode including lithium; an electrolyte disposed between the cathode and the anode; and an ion conductive membrane disposed between the anode and the electrolyte, wherein the ion conductive membrane may include the lithium ion conductor.

Also disclosed is method of preparing a solid ion conductor, the method including: providing a precursor composition including Li; Al; Mg; at least one of Ti, Ge, Zr, Hf, and Sn; and a phosphate; and thermally treating the precursor composition to provide a lithium ion conductor represented by Formula 1:

Formula 1 wherein, in Formula 1, M includes at least one of titanium (Ti), germanium (Ge), zirconium (Zr), hafnium (Hf), and tin (Sn), $0<x<0.6$, and $0<y<0.2$

BRIEF DESCRIPTION OF THE DRAWINGS

These and/or other aspects will become apparent and more readily appreciated from the following description of the embodiments, taken in conjunction with the accompanying drawings in which:

FIG. 6 is a graph of conductivity (Siemens per centimeter, S·cm$^{-1}$) versus y in $Li_{1+x+2y}Al_xMg_yTi_{2-x-y}(PO_4)_3$ showing conductivity results for powders prepared in Examples 1 to 4, and Comparative Examples A to C;

FIG. 7B illustrates the results of Rietveld refinement analysis of the neutron diffraction spectrum of Powder 1 of Example 1.

DETAILED DESCRIPTION

Figure 1:
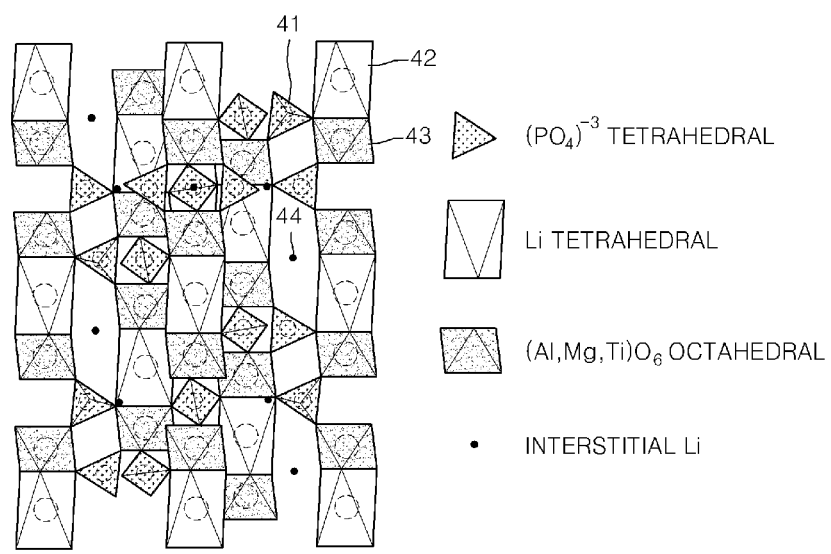
FIG. 1 is a schematic view of a crystal structure of an embodiment of a lithium ion conductor.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." As used herein, the singular forms "a," "an," and "the" are intended to include the plural forms, including expressions such as "at least one of," which when preceding a list of elements, modifies the entire list of elements and does not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as defined herein refers to an element of Groups 3 to 12 of the Periodic Table of the Elements.

"Rare earth" means the fifteen lanthanide elements, i.e., atomic numbers 57 to 71, plus scandium and yttrium.

Hereinafter, one or more embodiments of a lithium ion conductor, an electrolyte, and an active material, each including the lithium ion conductor, a lithium battery including the lithium ion conductor, and a method of manufacturing preparing the foregoing will be described in greater detail.

Lithium Ion Conductor

According to an aspect of the present disclosure, a lithium ion conductor is represented by Formula 1:

$$Li_{1+x+2y}Al_xMg_yM_{2-x-y}(PO_4)_3 \quad \text{Formula 1}$$

wherein, in Formula 1, M comprises at least one of titanium (Ti), germanium (Ge), zirconium (Zr), hafnium (Hf), and tin (Sn); and $0<x<0.6$; and $0<y<0.2$, wherein x and y represent stoichiometric ratios (for example, atomic ratios) of Al and Mg, respectively.

In Formula 1, M may include at least one of Ti and Ge. For example, M may be Ti, but is not limited thereto.

In Formula 1, an oxidation number of M is 4, which, while not wanting to be bound by theory, is understood to be constant during migration of lithium ions (for example, during operation of a lithium battery including the lithium ion conductor).

In Formula 1, x may be in the range of $0<x\le0.3$, specifically $0.05<x\le0.29$, more specifically $0.1<x\le0.28$.

In Formula 1, y may be in the range of $0<y\le0.1$, specifically $0.01<y\le0.09$, more specifically $0.02<y\le0.08$. For example, in Formula 1, y may be in the range of $0<y\le0.05$.

According to an embodiment, in Formula 1, x and y may be in the range of $0<x\le0.3$ and $0<y\le0.1$.

According to other embodiment, in Formula 1, x and y may be in the range of $0<x\le0.3$ and $0<y\le0.05$.

When x and y in Formula 1 are within the above ranges, the lithium ion conductor may have improved conductivity.

In Formula 1, all of the Al and the Mg may be substituted for M at an M site in the lithium ion conductor of Formula 1.

FIG. 1 is a schematic view of a crystal structure of an embodiment of a lithium ion conductor of the formula $Li_{1+x+2y}Al_xMg_yTi_{2-x-y}(PO_4)_3$. Shown in FIG. 1 is a $(PO_4)^{3-}$ tetrahedra 41, a first Li in an octahedral site 42, a (Al,Mg,Ti)O$_6$ octahedra 43, and a interstitial second Li 44. In the (Al,Mg,Ti)O$_6$ octahedra 43, the oxygen octahedra may be Ti centered, or Al or Mg centered if the Ti is substituted by Al or Mg, for example.

For the lithium ion conductor of FIG. 1, phosphate $(PO_4)^{3-}$ tetrahedra, which have a tetrahedral structure, and the (Al, Mg, Ti)O$_6$ octahedra, which have an octahedral structure, are covalently bonded via oxygen atom. The first Li 41, which is in an octahedral site, is within an octahedral structure defined by the (Al, Mg, Ti)O$_6$ octahedra. In the (Al, Mg, Ti)O$_6$ octahedra, since Al, which has an oxidation number of 3 (assuming a stoichiometric amount of Al as "x" in Formula 1), and Mg, which has an oxidation number of 2 (assuming a stoichiometric amount of Mg as "y" in Formula 1), are substituted at Ti sites having an oxidation number of 4, an amount of lithium ions in the lithium ion conductor of FIG. 1 may be increased by "x+2y" on a stoichiometric ratio basis. The additional lithium may be disposed at interstitial sites, e.g., see the interstitial second Li 44 of FIG. 1 in a lithium ion conductor with an increased amount of Li in an amount of "x+2y" in Formula 1. While not wanting to be bound by theory, it is understood that because the lithium ion conductor contains an increased amount of lithium ions, the lithium ion conductivity of Formula 1 may have improved conductivity.

The lithium ion conductor of Formula 1 contains phosphate $(PO_4)^{3-}$ as polyanions, so that it may have high ion conductivity.

The lithium ion conductor may have an Na super-ionic conductor ("NASICON") structure. A NASICON structure refers to a structure where octahedral and tetrahedral units are bound (for example, through oxygen atoms), independent from types of ions transferred by the structure (that is, the NASION structure may transfer Na ions, Li ions, or the like).

Method of Preparing the Lithium Ion Conductor

A method of preparing the lithium ion conductor of Formula 1 may include contacting, e.g., mixing, a Li-containing precursor (for example, lithium carbonate, lithium hydroxide, or the like), an Al-containing precursor (for example, aluminum oxide, aluminum carbonate, or the like), an Mg-containing precursor (for example, magnesium oxide magnesium hydroxide, or the like), an M-containing precursor (for example, an M-containing oxide, or the like, wherein M is at least one of titanium (Ti), germanium (Ge), zirconium (Zr), hafnium (Hf), and tin (Sn)), and a P-containing precursor (for example, $(NH_4)_2HPO_4$, or the like) to obtain a precursor mixture; and calcining the precursor mixture at a temperature of from about 800° C. to about 1250° C. in air for about 1 hour to about 40 hours. When the calcination temperature and time are within these ranges, phase decomposition and lithium volatilization may be prevented, and sufficient sintering may occur.

Suitable Al-containing precursors may include $Al(OH)_3$, $Al(NO_3)_3$, $AlO(OH)$, organo-metallic salts of Al including fatty acid salts, Al compounds which decompose on heating to yield $Al_2O_3$, and a combination thereof.

Suitable Mg-containing precursors may include $MgCO_3$, $Mg(OH)_2$, $Mg(NO_3)_2$, organometallic salts of Mg including fatty acid salts, Mg compounds which decompose on heating to yield MgO, and a combination thereof.

Suitable M-containing precursors may include oxides, hydroxides, oxy-hydroxides, nitrates, carbonates, metallic salts, fatty acid salts, and compounds of titanium (Ti), germanium (Ge), zirconium (Zr), hafnium (Hf), and tin (Sn), M compounds which decompose on heating to yield the corresponding oxide, and a combination thereof. Oxides, such as $TiO_2$ are specifically mentioned.

The P-containing precursor may be any suitable compound of the formula $A_zH_{3-z}PO_4$ wherein $0\le z<3$, preferably $0<z<3$, wherein A is a suitable alkali metal, such as Li, or other suitable cation such as ammonium.

The precursor mixture may be mixed and/or ground using, for example, a ball mill. The ball mill may use balls that are unreactive with the precursor mixture, for example, zirconia balls.

The method of preparing a lithium ion conductor may further include pre-heating the precursor mixture before the calcination operation at a temperature lower than the calcination temperature. The pre-heating may be performed multiple times, e.g., at least twice. In some embodiments, the pre-heating may be include a first pre-heating process of heating the precursor mixture at a temperature of from about 200° C. to about 800° C. for about 1 hour to about 40 hours; and a second pre-heating process of heating a product from the first pre-heating process at a temperature of from about 400° C. to about 1200° C. for about 1 hour to about 40 hours.

The lithium ion conductor obtained by the above-described method may be in any of a variety of forms, for example power, thin film, pellets, or the like, which may be selectively chosen depending on the use of the lithium ion conductor.

Solid Electrolyte Including the Lithium Ion Conductor

According to another aspect, a solid electrolyte includes the lithium ion conductor represented by Formula 1. By including the lithium ion conductor of Formula 1, the solid electrolyte may have high conductivity, high chemical stability, and a wide potential window, and the solid electrolyte may be effectively used as an electrolyte in a lithium battery.

In some embodiments, the solid electrolyte may further include a second solid ion conductor, in addition to the lithium ion conductor of Formula 1. For example, the solid electrolyte may further include a sulfide-based conductor and/or an oxide-based conductor that are used in the art. In some embodiments, the solid electrolyte may further include at least one selected from among $Li_3N$, a Lithium Super Ionic Conductor ("LISICON") such as $Li_{14}ZnGe_4O_{16}$, a lithium phosphorous oxynitride ("LIPON"), e.g., $Li_{3-y}PO_{4-x}N_x$ wherein $0<y<3$, and $0<x<4$, a thio-LISICON, e.g., $Li_{3.25}Ge_{0.25}P_{0.75}S_4$, $Li_2S$, $Li_2S—P_2S_5$, $Li_2S—SiS_2$, $Li_2S—GeS_2$, $Li_2S—B_2S_5$, $Li_2S—Al_2S_5$, and $Li_2O—Al_2O_3—TiO_2—P_2O_5$ ("LATP"), in addition to the lithium ion conductor of Formula 1.

The solid electrolyte may be in powder or solid form. The solid electrolyte in solid form may be, for example, in the form of a pellet, thin film, or the like, but is not limited thereto. The solid electrolyte may be in any suitable form depending on the desired structure of a lithium battery including the solid electrolyte.

Active Material Including the Lithium Ion Conductor

An active material may include a core including a material capable of intercalating and deintercalating lithium ions; and a shell disposed on, e.g., covering, at least a portion of a surface of the core, wherein the shell may include the lithium ion conductor of Formula 1. In some embodiments, the shell may be formed as a coating layer covering the entire surface of the core.

The core may be selected from among suitable cathode active materials and anode active materials that are known in the art and capable of intercalating and deintercalating lithium ions. In some embodiments, the core may be selected from among the cathode active materials and anode active materials that will be further described below.

The shell of the active material may include the lithium ion conductor. Accordingly, formation of a thin film, a side reaction, or the like, caused from direct contact between the core and the electrolyte during charging and discharging operations is suppressed, and deterioration of the core and generation of undesired gas from the cathode and/or anode may be effectively or entirely prevented. Furthermore, migration of lithium ions between the core and the electrolyte may be facilitated so that an improved lithium battery may be provided.

All-Solid-State Lithium Battery

According to another aspect, an all-solid-state lithium battery may include a solid electrolyte including the lithium ion conductor of Formula 1.

Due to including the lithium ion conductor of Formula 1, which is capable of improving ion conductivity, the all-solid-state lithium battery may have reduced interfacial resistance between the electrode and the solid electrolyte, and thus have reduced polarization and improved energy efficiency.

The all-solid-state lithium battery may include a cathode, an anode, and a solid electrolyte disposed between the cathode and the anode. In some embodiments, the all-solid-state lithium battery may further include a polymer electrolyte membrane between the cathode and the solid electrolyte and/or the anode and the solid electrolyte. The further inclusion of the polymer electrolyte membrane may improve adhesion between the cathode and the solid electrolyte, and/or the anode and the solid electrolyte, so that a high-quality all-solid-state lithium battery may be implemented. The polymer electrolyte membrane may be impregnated with an organic electrolyte solution containing a lithium salt and an organic solvent.

The all-solid-state lithium battery may be manufactured in the following manner.

First, a solid electrolyte including the lithium ion conductor of Formula 1 is prepared.

Next, a cathode is prepared, for example, by forming a cathode active material layer including a cathode active material on a current collector. The cathode active material layer may be prepared using a vapor phase method or a solid phase method. Non-limiting examples of the vapor phase method are pulse laser deposition ("PLD"), sputtering deposition, and chemical vapor deposition ("CVD"). Any suitable method available in the art may be used. Non-limiting examples of the solid phase method are sintering, a sol-gel method, a doctor blade method, a screen printing method, a slurry cast method, and a powder pressing method. Any suitable method available in the art may be used.

The cathode active material may be any suitable material for a lithium battery. Examples of the cathode active material are a lithium transition metal oxide and a transition metal sulfide.

For example, the cathode active material may be at least one of a composite oxide of lithium with at least one metal selected from among Co, Mn, and Ni. Examples of the cathode active material are compounds represented by at least one of $Li_aA_{1-b}R_bD_2$ (where $0.90 \le a \le 1.8$, and $0 \le b \le 0.5$); $Li_aE_{1-b}R_bO_{2-c}D_c$ (where $0.90 \le a \le 1.8$, $0 \le b \le 0.5$, and $0 \le c \le 0.05$); $LiE_{2-b}R_bO_{4-c}D_c$ (where $0 \le b \le 0.5$, and $0 \le c \le 0.05$); $Li_aNi_{1-b-c}Co_bR_cD_\alpha$ (where $0.90 \le a \le 1.8$, $0 \le b \le 0.5$, $0 \le c \le 0.05$, and $0 < \alpha \le 2$); $Li_aNi_{1-b-c}Co_bR_cO_{2-\alpha}X_\alpha$ (where $0.90 \le a \le 1.8$, $0 \le b \le 0.5$, $0 \le c \le 0.05$, and $0 < \alpha < 2$); $Li_aNi_{1-b-c}Co_bR_cO_{2-\alpha}X_2$ (where $0.90 \le a \le 1.8$, $0 \le b \le 0.5$, $0 \le c \le 0.05$, and $0 < \alpha < 2$); $Li_aNi_{1-b-c}Mn_bR_cD_\alpha$ (where $0.90 \le a \le 1.8$, $0 \le b \le 0.5$, $0 \le c \le 0.05$, and $0 < \alpha \le 2$); $Li_aNi_{1-b-c}Mn_bR_cO_{2-\alpha}X_\alpha$ (where $0.90 \le a \le 1.8$, $0 \le b \le 0.5$, $0 \le c \le 0.05$, and $0 < \alpha < 2$); $Li_aNi_{1-b-c}Mn_bR_cO_{2-\alpha}X_2$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \le a \le 1.8$, and $0.001 \le b \le 0.1$); $QO_2$; $QS_2$; $LiQS_2$; $V_2O_5$; $LiV_2O_2$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the foregoing formulas of the cathode active material, A is at least one of nickel (Ni), cobalt (Co), and manganese (Mn); R is at least one of aluminum (Al), nickel (Ni), cobalt (Co), manganese (Mn), chromium (Cr), iron (Fe), magnesium (Mg), strontium (Sr), vanadium (V), and a rare earth element; D is at least one of oxygen (O), fluorine (F), sulfur (S), and phosphorous (P); E is at least one of cobalt (Co), and manganese (Mn); X is at least one of fluorine (F), sulfur (S), and phosphorous (P); G is at least one of aluminum (Al), chromium (Cr), manganese (Mn), iron (Fe), magnesium (Mg), lanthanum (La), cerium (Ce), strontium (Sr), and vanadium (V); Q is at least one of titanium (Ti), molybdenum (Mo), and manganese (Mn); Z is at least one of chromium (Cr), vanadium (V), iron (Fe), scandium (Sc), and yttrium (Y); J is at least one of vanadium (V), chromium (Cr), manganese (Mn), cobalt (Co), nickel (Ni), and copper (Cu).

Non-limiting examples of the cathode active material are $LiCoO_2$, $LiMn_xO_{2x}$ (x=1, 2), $LiNi_{1-x}Mn_xO_{2x}(0<x<1)$, $Ni_{1-x-y}Co_xMn_yO_2$ ($0 \le x \le 0.5$, and $0 \le y \le 0.5$), $LiFePO_4$, $TiS_2$, $FeS_2$, $TiS_3$, and $FeS_3$.

The cathode may further include the lithium ion conductor represented by Formula 1, in addition to the cathode active material.

An amount of the lithium ion conductor in the cathode may be from above 0 weight percent (wt %) to about 50 wt % or less, and in some embodiments, may be from above 0 wt % to about 30 wt % or less, and in some other embodiments, may be from above 0 wt % to about 10 wt % or less. When the amount of the lithium ion conductor is within these ranges, a lithium battery may be manufactured using the same without a reduction in battery capacity.

In some embodiments, a protective layer or film including the lithium ion conductor of Formula 1 may be further disposed between a surface of the cathode active material layer of the cathode and the solid electrolyte. The protective layer may suppress side reaction between the cathode active material layer and the electrolyte and prevent or suppress formation of dendrite, and may reduce interfacial resistance between the cathode and the solid electrolyte, and thus improve ion conductivity in the cathode active material layer, and may improve thermal stability of the cathode. Accordingly, a high-quality lithium battery may be implemented.

In some embodiments, a cathode active material in the cathode active material layer of the cathode may include a core including a material capable of intercalating and deintercalating lithium ions; and a shell covering at least a portion of a surface of the core, wherein the shell may include the lithium ion conductor of Formula 1. For example, the material capable of intercalating and deintercalating lithium ions lithium ions in the core may be at least one of a cathode active material in use in the art. The shell may be a coating layer covering the entire surface of the core. The shell may suppress or prevent formation of a thin film, a side reaction, or the like, which may be caused by direct contact between the core and the electrolyte during charging and discharging operations, to prevent or suppress deterioration of the core, and may suppress generation of undesired gas from the cathode and/or anode. Furthermore, migration of lithium ions between the core and the electrolyte may be facilitated so that a high-quality lithium battery may be provided.

In some other embodiments, the lithium ion conductor of Formula 1 may be dispersed in powder form in the cathode active material layer of the cathode. Accordingly, migration of the lithium ions between the solid electrolyte and the cathode may be facilitated.

The cathode active material layer may further include, for example, a conducting agent, a binder, or the like. The conducting agent and the binder may be any suitable material available in the art.

Next, an anode is prepared in the same manner as the cathode, except that an anode active material, instead of the cathode active material, is used.

The anode active material may be any suitable material in use for lithium batteries. For example, the anode active material may include at least one of lithium metal, a metal that is alloyable with lithium, a transition metal oxide, a non-transition metal oxide, and a carbonaceous material.

Examples of the metal alloyable with lithium are at least one of silicon (Si), tin (Sn), aluminum (Al), germanium (Ge), lead (Pb), bismuth (Bi), antimony (Sb), a Si—$A_1$ alloy (wherein $A_1$ is at least one of an alkali metal, an alkali earth metal, a Group 13 element, a Group 14 element, a transition metal, and a rare earth element, wherein Si is excluded), and a Sn—$A_2$ alloy (wherein $A_2$ is at least one of an alkali metal, an alkali earth metal, a Group 13 element, a Group 14 element, a transition metal, and a rare earth element, wherein Sn is excluded). The elements $A_1$ and $A_2$ may each independently be at least one of magnesium (Mg), calcium (Ca), strontium (Sr), barium (Ba), radium (Ra), scandium (Sc), yttrium (Y), titanium (Ti), zirconium (Zr), rutherfordium (Rf), hafnium (Hf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and polonium (Po).

Non-limiting examples of the transition metal oxide are a lithium titanium oxide, a vanadium oxide, and a lithium vanadium oxide.

Non-limiting examples of the non-transition metal oxide are $SnO_2$ and $SiO_x$ ($0<x \le 2$).

Examples of the carbonaceous material are crystalline carbon, amorphous carbon, and mixtures thereof. Examples of the crystalline carbon are graphite, such as natural graphite or artificial graphite in a formless, plate, flake, spherical, or fibrous form. Examples of the amorphous carbon include soft carbon (e.g., carbon sintered at low temperatures), hard carbon, mesocarbon, meso-phase pitch carbides, sintered corks, and the like.

The anode may further include the lithium ion conductor of Formula 1, in addition to the anode active material, as in the cathode.

An amount of the lithium ion conductor in the anode may be from above 0 wt % to about 50 wt % or less, and in some embodiments, may be from above 0 wt % to about 30 wt % or less, and in some other embodiments, may be from above 0 wt % to about 10 wt % or less. When the amount of the lithium ion conductor is within these ranges, a lithium battery may be manufactured using the same without a reduction in battery capacity.

In some embodiments, a protective layer or film including the lithium ion conductor of Formula 1 may be further disposed between a surface of the anode active material layer of the anode and the solid electrolyte. The protective layer may prevent or suppress a side reaction between the anode active material layer and the electrolyte and prevent or suppress formation of a dendrite, and may reduce interfacial resistance between the anode and the solid electrolyte, and thus may improve ion conductivity in the anode active material layer, and may improve thermal stability of anode. Accordingly, a high-quality lithium battery may be implemented.

In some other embodiments, an anode active material in the anode active material layer of the anode may include a core including a material capable of intercalating and deintercalating lithium ions; and a shell disposed on, e.g., covering, at least a portion of a surface of the core, wherein the shell may include the lithium ion conductor of Formula 1. For example, the material capable of intercalating and deintercalating lithium ions lithium ions in the core may be any suitable anode active materials in use in the art. The shell may be a coating layer covering the entire surface of the core. The shell may suppress formation of a thin film, a side reaction, or the like, caused from direct contact between the core and the electrolyte during charging and discharging operations, to prevent deterioration of the core, and may suppress generation of undesired gas from the anode. Furthermore, migration of lithium ions between the core and the electrolyte may be facilitated so that a high-quality lithium battery may be implemented.

In some other embodiments, the lithium ion conductor of Formula 1 may be dispersed in powder form in the anode active material layer of the anode. Accordingly, migration of the lithium ions between the solid electrolyte and the anode may be facilitated.

Figure 2:
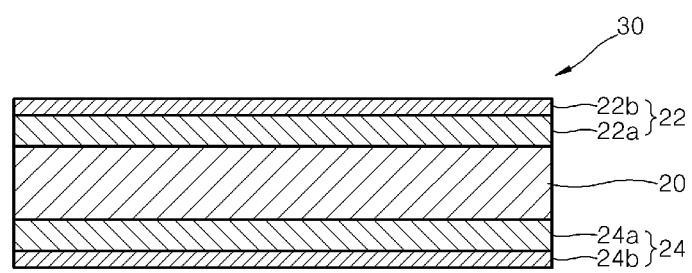
FIG. 2 is a schematic view of an embodiment of an all-solid-state lithium battery.

Referring to FIG. 2, an all-solid-state lithium battery 30 may include a solid electrolyte layer 20, a cathode 22 disposed on a surface of the solid electrolyte layer 20, and an anode 24 disposed on the a surface of the solid electrolyte layer 20 opposite to the surface on which the cathode 22 is disposed. The cathode 22 may include a cathode active material layer 22a in contact with the solid electrolyte layer 20, and a cathode current collector 22b in contact with the cathode active material layer 22a. The anode 24 may include an anode active material layer 24a in contact with the solid electrolyte layer 20, and an anode current collector 24b in contact with the anode active material layer 24a. The all-solid-state lithium battery 30 may be manufactured using a solid phase method, a vapor phase method, or a combination thereof. For example, the cathode active material layer 22a and the anode active material layer 24a may be formed on the opposite surfaces of the solid electrolyte layer 20 using at least one of the vapor phase method and the solid phase method, and then the cathode and anode current collectors 22b and 24b may be formed on the cathode active material layer 22a and the anode active material layer 24a, respectively, thereby manufacturing the all-solid-state lithium battery 30. In some other embodiments, the all-solid-state lithium battery may be manufactured by sequentially stacking the anode active material layer 24a, the solid electrolyte layer 20, the cathode active material layer 22a and the cathode current collector 22b on the anode current collector 24b using at least one of the vapor phase method and solid phase method. Any of a variety of methods may be used to manufacture the all-solid-state lithium battery 30.

Lithium Battery Including an Organic Electrolyte Solution

According to another aspect, a lithium battery includes: a cathode including a cathode active material; an anode including an anode active material, and an organic electrolyte solution, wherein at least one of the cathode, the anode, and the organic electrolyte solution may include the lithium ion conductor of Formula 1. By including the lithium ion conductor, the lithium battery may have improved ion conductivity, improved lifetime, and improved thermal stability.

When the cathode further includes the lithium ion conductor of Formula 1, in addition to the cathode active material, an amount of the lithium ion conductor in the cathode may be from above 0 wt % to about 50 wt % or less, and in some embodiments, may be from above 0 wt % to about 30 wt % or less, and in some other embodiments, may be from above 0 wt % to about 10 wt % or less. When the amount of the lithium ion conductor is within these ranges, a lithium battery may be manufactured using the same without a reduction in battery capacity.

When the anode further includes the lithium ion conductor of Formula 1, in addition to the anode active material, an amount of the lithium ion conductor in the anode may be from above 0 wt % to about 50 wt % or less, and in some embodiments, may be from above 0 wt % to about 30 wt % or less, and in some other embodiments, may be from above 0 wt % to about 10 wt % or less. When the amount of the lithium ion conductor is within these ranges, a lithium battery may be manufactured using the same without a reduction in battery capacity.

The detailed descriptions of the cathode and the anode provided above in connection with the all-solid-state battery may be referred to for the cathode and anode of the lithium battery.

The organic electrolyte solution and/or separator of the lithium battery may include the lithium ion conductor of Formula 1.

The lithium battery including the organic electrolyte solution may be manufactured as follows.

To manufacture a cathode plate, a cathode active material composition including a cathode active material, a conducting agent, a binder, and a solvent is prepared. Then, the cathode active material composition is coated directly on a current collector (for example, an aluminum (Al) current collector) and dried to manufacture the cathode plate. Alternatively, the cathode active material composition may be cast on a separate support to form a film, which is then separated from the support and laminated on the current collector to manufacture the cathode plate. In some embodiments, an excess of a solvent may be added to the cathode active material composition to prepare an electrode ink composition, which may then be printed on a current collector or a support using ink-jetting or Gravure printing to manufacture the cathode plate. Any of a variety of printing methods that may be used in general coating or printing may be used.

When the cathode further includes a protective film including the lithium ion conductor, after formation of the cathode active material layer, the protective film may be formed on a surface of the cathode active material layer by using a vapor phase method, a solid phase method, or a coating method using a slurry containing the lithium ion conductor, as described above.

As described in the Sections entitled Active Material Including The Lithium Ion Conductor and All-Solid-State Lithium Battery above, a cathode active material of the cathode active material composition may have a core-shell structure with the shell including the lithium ion conductor of Formula 1, and thus the cathode active material layer may also contain the lithium ion conductor.

In an embodiment, the lithium ion conductor of Formula 1 may be added in powder form into the cathode active material composition, so that the lithium ion conductor powder may be dispersed in the cathode active material layer.

An example of the conducting agent is carbon black. Examples of the binder are at least one of vinylidene fluoride/hexafluoropropylene copolymer, polyvinylidene fluoride ("PVDF"), polyacrylonitrile, polymethylmethacrylate, polytetrafluoroethylene, polyimide, polyamideimide, styrene-butadiene rubber polymer, acrylate-based rubber, and sodium carboxymethylcellulose. Examples of the solvent are N-methyl-pyrrolidone, acetone, and water.

The amounts of the cathode active material, the conducting agent, the binder, and the solvent may be those levels that are used in the manufacture of lithium batteries in the art, and which may be determined without undue experimentation.

Next, to prepare an anode plate, as in the preparation of the cathode plate, an anode active material, a conducting agent, a binder, and a solvent are mixed together to prepare an anode active material composition. Then, the anode active material composition may be coated directly on a current collector (for example, a copper (Cu) current collector) and dried to manufacture the anode plate. Alternatively, the anode active material composition may be cast on a separate support to form a film, which is then separated from the support and laminated on the current collector to manufacture the anode plate. In some embodiments, an excess of a solvent may be added to the anode active material composition to prepare an electrode ink composition, which may then be printed on a support using ink-jet or Gravure printing to manufacture the anode plate. Any suitable printing methods that may be used in coating or printing may be used.

The same conducting agent, binder and solvent as those for the cathode plate may be used to form the anode active material. The amounts of the negative active material, the conducting agent, the binder, and the solvent may be those levels that are used in the manufacture of lithium batteries in the art, and which may be determined without undue experimentation.

When the anode further includes a protective film including the lithium ion conductor, after formation of the anode active material layer, the protective film may be formed on a surface of the anode active material layer by using a vapor phase method, a solid phase method, or a coating method using a slurry containing the lithium ion conductor, as described above.

As described in the Sections entitled Active Material Including The Lithium Ion Conductor and All-Solid-State Lithium Battery above, an anode active material of the anode active material composition may have a core-shell structure with the shell including the lithium ion conductor of Formula 1, and thus the anode active material layer may also contain the lithium ion conductor.

In some embodiments, the lithium ion conductor of Formula 1 may be added in powder form into the anode active material composition, so that the lithium ion conductor powder may be dispersed in the anode active material layer.

In some embodiments, a plasticizer may be added to the cathode active material composition and/or the anode active material composition to incorporate pores in the electrode plates.

Next, a separator is prepared.

The cathode and the anode may be separated from each other by the separator. Any suitable separator that is used in lithium batteries may be used. The separator may be formed of a material having low resistance to migration of ions in the organic electrolyte solution and good ability to retain the organic electrolyte. Examples of the separator may include at least one of glass fiber, polyester, Teflon, polyethylene, polypropylene, and polytetrafluoroethylene ("PTFE"), each of which may be a non-woven or woven fabric. For example, a rollable separator including polyethylene or polypropylene may be used for a lithium secondary battery. A separator with good organic electrolyte solution retaining capability may be used for a lithium ion polymer battery.

The separator may be manufactured as follows. A polymer resin, a filler, and a solvent are mixed to prepare a separator composition. Then, the separator composition may be coated directly on an electrode, and then dried to form a separator film. Alternatively, the separator composition may be cast on a separate support and then dried to form a separator composition film, which is then removed from the support and laminated on an electrode to form a separator film.

The polymer resin may be any suitable material that is used as a binder for electrode plates. Examples of the polymer resin include at least one of a vinylidenefluoride/hexafluoropropylene copolymer, polyvinylidene fluoride ("PVDF"), polyacrylonitrile, and polymethylmethacrylate. For example, a vinylidenefluoride/hexafluoropropylene copolymer containing 8 to 25 wt % of hexafluoropropylene may be used, but is not limited thereto.

Next, an organic electrolyte solution is prepared, for example, by mixing an organic solvent and a lithium salt together.

The organic solvent may be any suitable organic solvent available in the art. Non-limiting examples of the organic solvent are at least one of propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, and dimethyl ether.

The lithium salt may be any material available as a lithium salt in the art. Non-limiting examples of the lithium salt are at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently different integers from 1 to 20), LiCl, and LiI.

An amount of the lithium salt may be from about 0.01 molar (M) to about 2.0 M, but is not limited thereto. The amount of the lithium salt may be appropriately varied within the range of improving performance of the lithium battery.

The organic electrolyte solution may further include a phosphorous-based incombustible material or a halogen-based incombustible material.

Figure 3:
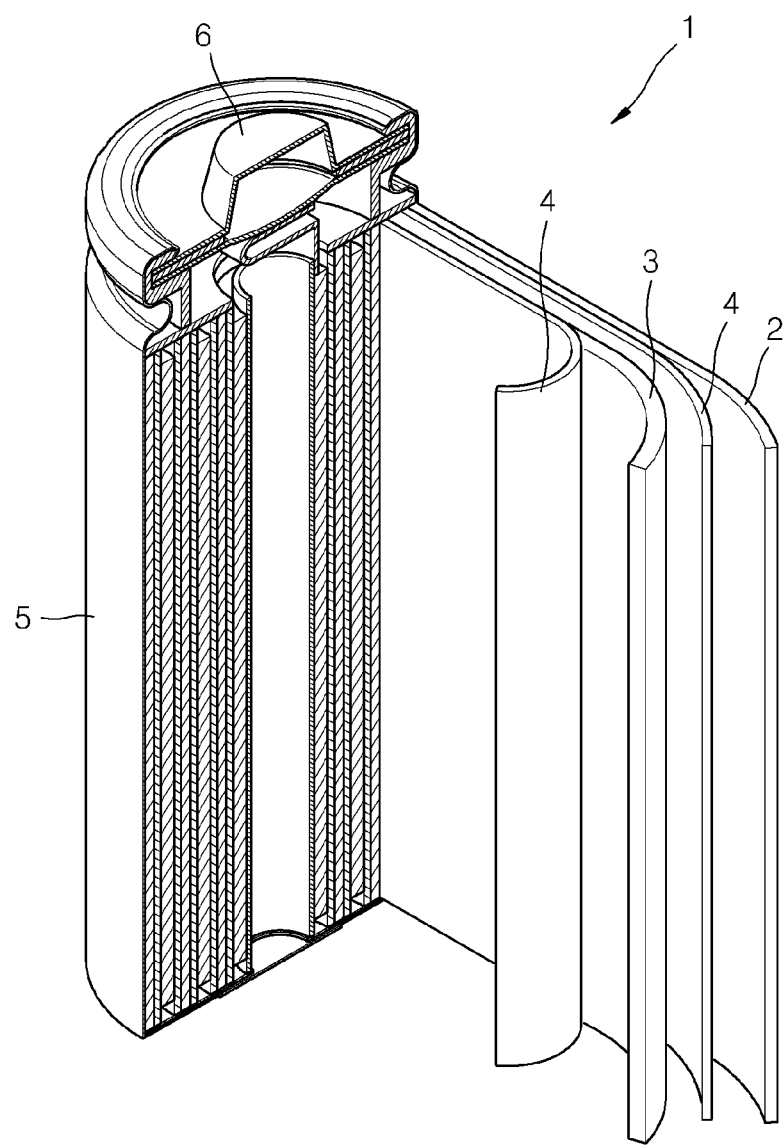
FIG. 3 is a schematic view of an embodiment of a lithium battery including an organic electrolyte.

Referring to FIG. 3, a lithium battery 1 according to an embodiment includes a cathode 3, an anode 2, and a separator 4. The cathode 3, the anode 2, and the separator 4 are wound or folded, and then accommodated in a battery case 5. Then, the battery case 5 is filled with an organic electrolyte solution (not shown) and sealed with a cap assembly 6, thereby completing the manufacture of the lithium battery 1. The battery case 5 may have a cylindrical shape, a rectangular shape or a thin-film shape. For example, the lithium battery 1 may be a large thin-film type battery. The lithium battery 1 may be a lithium ion battery.

In some embodiments, unlike the lithium battery of FIG. 3, a pair of battery assemblies each including a cathode an anode, and a separator disposed between the cathode and the anode may be disposed, e.g., stacked, upon one another to form a bi-cell structure and impregnated with an organic electrolyte solution. Then, the resulting structure may be encased in a pouch and sealed, thereby manufacturing a lithium ion polymer battery.

In some other embodiments, a plurality of battery assemblies, each including a cathode, an anode, and a separator disposed between the cathode and the anode, may be stacked upon one another, thereby manufacturing a battery pack. This battery pack may be used in any device to provide high capacity and high-power output, for example, in a laptop computer, a smart phone, electric vehicle ("EV"), and the like.

The lithium battery may have high thermal stability and improved high rate characteristics, and thus may be applicable in an electric vehicle ("EV"), for example, in a hybrid vehicle such as plug-in hybrid electric vehicle ("PHEV"). The lithium battery may be applicable for electricity storage systems ("ESS") for storing high electric power.

Lithium Air Battery

In another aspect, a lithium battery includes the lithium ion conductor of Formula 1. By including the lithium air battery, the lithium air battery may have improved stability and energy efficiency.

The lithium air battery may include a cathode, an anode, and a separator, wherein an ion conductor film including the lithium ion conductor of Formula 1 may be disposed on a surface of at least one of the cathode, anode, and separator.

In some embodiments, the ion conductor film including the lithium ion conductor may be disposed on a surface of the anode opposite to the cathode of the lithium air battery. This may prevent or suppress a side reaction between the anode and the electrolyte, and thus improve lifetime characteristics of the lithium air battery.

In some other embodiments, an ion conductor film including the lithium ion conductor of Formula 1 may be disposed on at least one surface of the separator of the lithium air battery.

Figure 4:
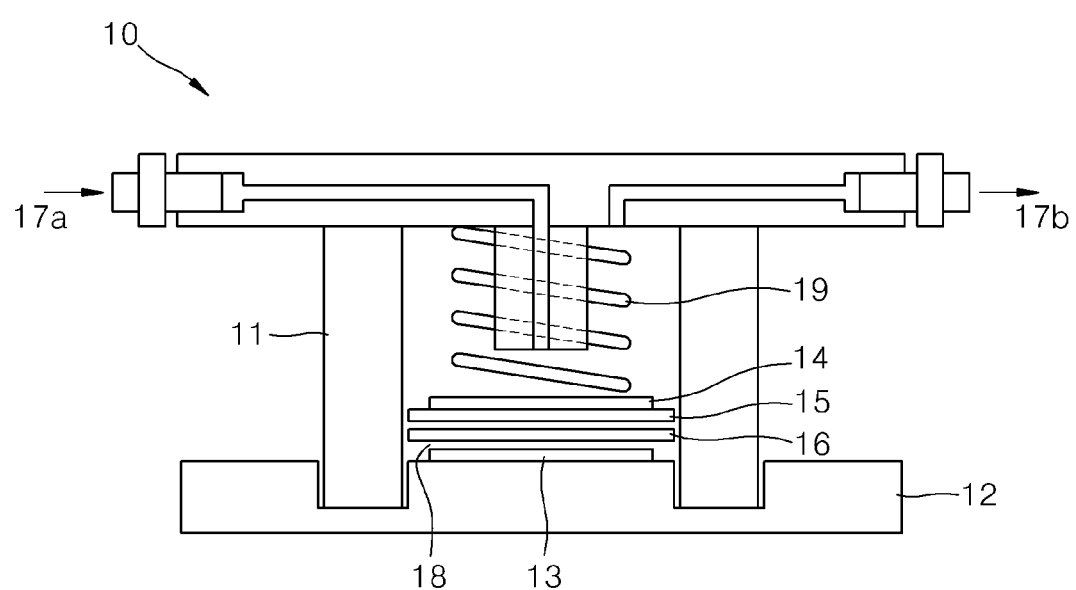
FIG. 4 is a schematic view of an embodiment of a lithium air battery.

Referring to FIG. 4, a lithium air battery 10 according to an embodiment includes a cathode 15 disposed on a first current collector 14 and including oxygen as an active material, an anode 13 adjacent to a second current collector 12 and including lithium, and an organic electrolyte 18 between the cathode 15 and the anode 13, and a separator 16 disposed on a surface of the cathode 15. An ion conductor film (not shown) containing the lithium ion conductor may be disposed on a surface of the anode 13. The first current collector 14, which is porous, may serve as a gas diffusion layer allowing diffusion of gas. A pressing member 19 allowing air to reach the cathode 15 may be further disposed above the first current collector 14. A case 11 made of an insulating resin may be disposed between the cathode 15 and the anode 13 to electrically isolate the cathode 15 and the anode 13 from each other. Air is supplied via an air inlet 17a and is exhausted through an air outlet 17b.

As used herein, the term "air" is not limited to atmospheric air, and may refer to a combination of gases including oxygen, or pure oxygen gas. This broad definition of "air" also applies to other terms, including "air battery", and "air electrode."

Since the cathode 15 includes oxygen as the active material, and the anode 13 includes lithium (for example, the anode 13 may be a lithium metal anode), the lithium air battery include relatively less active materials, and thus may be light-weight.

An embodiment of a method of manufacturing the lithium air battery 10, will be further described below.

The anode 13 is disposed on an inner side of the case 11, and an ion conductor film (not shown) including the lithium ion conductor of Formula 1 is disposed on a surface of the anode 13. Subsequently, the cathode 15 with the separator 10 on a surface opposite to the anode 13 is disposed to opposite to the anode 13. Subsequently, an electrolyte 18 (for example, an organic electrolyte solution) is injected between the cathode 15 and the anode 13, and then a porous current collector 14 is disposed on the cathode 15. Afterward, the pressing member 19 that allows air to reach the cathode 15 is pushed to complete the manufacture of the lithium air battery 10.

The cathode 15 may be formed by mixing an oxygen oxidation/reduction catalyst, a conductive material, and a binder together and adding an appropriate solvent to the mixture to prepare a cathode slurry, and coating and drying the cathode slurry on a surface of the current collector. In some embodiments, to improve electrode density, the cathode 15 may be manufactured by press-molding the cathode slurry on the current collector 14.

The conductive material may be porous. Any suitable porous and conductive material may be used as the conductive material, and in some embodiments, a porous carbonaceous material may be used. Suitable carbonaceous materials include at least one of carbon black, graphite, graphene, activated carbon, mesocarbon, and carbon fiber. Metallic conductive materials, including metal fibers and metal meshes, may be used. Metal powder of copper, silver, nickel, aluminum, and the like may be used. Organic conductive materials, including polyphenylene derivatives, may be used. The above-listed conductive materials may be used alone or in a combination.

Non-limiting examples of a catalyst that helps oxidation and reduction of oxygen are precious metal-based catalysts, such as platinum (Pt), gold (Au), silver (Ag), palladium (Pd), ruthenium (Ru), rhodium (Rh), and osmium (Os); oxide-based catalysts, such as manganese oxide, iron oxide, cobalt oxide, and nickel oxide; and organic metal-based catalysts, such as cobalt phthalocyanine. Any appropriate oxidation and reduction catalyst for oxygen available in the art may be used. The oxygen oxidation/reduction catalyst may be optionally omitted.

The catalyst may be supported on a support. Examples of the support include oxide, zeolite, clay mineral, and carbon. The oxide may include at least one oxide of alumina, silica, zirconium oxide, and titanium dioxide. The oxide may be an oxide bearing at least one metal of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon available as the support include, but are not limited to, carbon blacks, such as ketjen black, acetylene black, channel black, and lamp black; graphites, such as natural graphite, artificial graphite, and expanded graphite; activated carbons; and carbon fibers. Any appropriate material available as supports in the art may be used.

The binder may include a thermoplastic resin or a thermocurable resin. Examples of the binder are, but not limited to, polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in a combination. Any appropriate binder available in the art may be used. The binder may be excluded.

A porous body in a matrix or mesh form may be used as the cathode current collector 14 to facilitate diffusion of oxygen. A porous metal plate made of, for example, stainless steel, nickel, or aluminum may be used. Materials for the current collector are not particularly limited, and any appropriate material for current collectors available in the art may be used. The current collector may be coated with an anti-oxidation metal or alloy to prevent oxidation.

In some embodiments, the anode 13 capable of intercalating and deintercalating lithium may a lithium metal, a lithium metal alloy, or a material capable of intercalating and deintercalating lithium, but is not limited thereto. Any material including Li or capable of intercalating and deintercalating lithium that are available in the art may be used. The capacity of the lithium air battery 10 is determined by the anode 13. In this regard, the anode 13 may be, for example, a lithium metal. Examples of the lithium-based alloy are alloys with at least one of aluminum (Al), tin (Sn), magnesium (Mg), indium (In), calcium (Ca), titanium (Ti), and vanadium (V). The anode 13 may have any shape, and is not limited to a particular shape. For example, the anode 13 may be in the form of a sheet.

The separator 16 disposed between the cathode 15 and the anode 13 may have, without limitation, any suitable composition that is durable in the operational range of the lithium air battery 10. Non-limiting examples of the separator 16 are at least one of a polymeric non-woven fabric, such as polypropylene-based or polyphenylene sulfide-based non-woven fabric; and an olefin resin, such as polyethylene or polypropylene. In some other embodiments, the separator 16 may be omitted.

The electrolyte 18 may be an organic electrolyte or an aqueous electrolyte.

The organic electrolyte may include an aprotic solvent. Examples of the aprotic solvent are carbonates, esters, ethers, ketones, amines, and phosphines. Examples of the carbonates available as the nonaqueous organic solvent are dimethyl carbonate ("DMC"), diethyl carbonate ("DEC"), ethyl methyl carbonate ("EMC"), dipropyl carbonate ("DPC"), methylpropyl carbonate ("MPC"), ethyl propyl carbonate ("EPC"), methyl ethyl carbonate ("MEC"), ethylene carbonate ("EC"), propylene carbonate ("PC"), and butylene carbonate ("BC"). Examples of the esters available as the nonaqueous organic solvent are methyl acetate, ethyl acetate, n-propyl acetate, dimethyl acetate, methyl propionate, ethyl propionate, γ-butyrrolactone, decanolide, valerolactone, mevalonolactone, and caprolactone. Examples of the ethers available as the nonaqueous organic solvent are dibutyl ether, tetraglyme, diglyme, dimethoxyethane, 2-methyltetrahydrofuran, and tetrahydrofuran. An example of the ketones available as the nonaqueous organic solvent is cyclohexanone. Examples of the amines available as the nonaqueous organic solvent are triethylamine and triphenylamine. A non-limiting example of the phosphines available as the nonaqueous organic solvent is triethyphosphine. Any appropriate aprotic solvent available in the art may be used without limitation.

Examples of the aprotic solvent are nitriles (such as compounds of the formula R—CN, wherein R is a $C_2$-$C_{20}$ linear, branched, or cyclic hydrocarbon-based moiety that may include an double-bonded aromatic ring or an ether bond), amides (such as dimethylformamide), dioxolanes (such as 1,3-dioxolane), and sulfolanes.

The aprotic solvent may be used alone or in a combination of at least two. In the latter, a mixing ratio of the at least two aprotic solvents may be appropriately selected depending on a desired performance of the battery. A suitable combination and ratio thereof can be determined by one of ordinary skill in the art without undue experimentation.

The organic electrolyte may include an ionic liquid. Examples of the ionic liquid are a compound including cations of such as ammonium, imidazolium, pyrrolidinium, and piperidinium, and anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The organic electrolyte may include a salt of at least one of an alkali metal and an alkali earth metal. The salt of the at least one alkali metal and alkali earth metal, dissolved in an organic solvent, may be used as a source of at least one of alkali metal ions and alkali earth metal ions in the battery. The salt may facilitate migration of the alkali metal ions and/or alkali earth metal ions between the positive and negative electrodes.

For example, cations of the alkali metal salt and/or alkali earth metal salt may include lithium ions, sodium ions, magnesium ions, potassium ions, calcium ions, rubidium ions, strontium ions, cesium ions, barium ions, and the like.

Anions of the alkali metal salt and/or alkali earth metal salt in the organic electrolyte may include at least one kind of ion selected from $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x is a natural number), $(C_xF_{2x+1}SO_2)(C_yF_{2y+1}SO_2)N^-$ (wherein x and y are natural numbers), and halide.

The salt of at least one of the alkali metal and alkali earth metal may include, but is not limited to, at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiF, LiBr, LiCl, LiI, and $LiB(C_2O_4)_2$(LiBOB; lithium bis(oxalato) borate). Any appropriate alkali metal and alkali earth metal salts available in the art may be used.

In the organic electrolyte, an amount of the salt of at least one of alkali metal and alkali earth metal may be from about 100 mM to about 10 M, and in some embodiments, may be from about 500 mM to about 2 M. The amount of the salt is not limited to these ranges, and may be within any suitable range in which the organic electrolyte may effectively transfer lithium ions and/or electrons during charging and discharging.

An ion conductor membrane (not shown) including the lithium ion conductor of Formula 1 as an additional membrane disposed between the anode 13 and the electrolyte 18 may serve as a protective membrane for preventing impurities in the electrolyte (for example, water and oxygen in an aqueous electrolyte) from reacting directly with lithium of the anode 13. The ion conductor membrane may further include, in addition to the lithium ion conductor of Formula 1, a lithium ion conductor in use in the membrane may further include $Li_{1+x+y}(Al, Ga)_x(Ti, Ge)_{2-x}Si_yP_{3-y}O_{12}$ (where 0≤x≤1 and 0≤y≤1, for example, 0≤x≤0.4 and 0≤y≤0.6, or 0.1≤x≤0.3, and 0.1≤y≤0.4). Non-limiting examples of the lithium ion-conductive glass-ceramic are lithium-aluminum-germanium-phosphate ("LAGP"), lithium-aluminum-titanium-phosphate ("LATP"), and lithium-aluminum-titanium-silicon-phosphate ("LATSP").

The ion conductor membrane may further include, in addition to the lithium ion conductor of Formula 1, a polymer solid electrolyte. The polymer solid electrolyte may be a polyethylene oxide doped with a lithium salt. Non-limiting examples of the lithium salt are $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_2CF_3)_2$, $LiC_4F_9SO_3$, and $LiAlCl_4$.

The ion conductor membrane may further include an inorganic solid electrolyte, in addition to the lithium ion conductor of Formula 1. Non-limiting examples of the inorganic solid electrolyte are $Cu_3N$, $Li_3N$, and LiPON.

The lithium air battery is available either as a lithium primary battery or a lithium secondary battery. The lithium air battery may have any of various shapes, and in some embodiments, may have a shape like a coin, a button, a sheet, a stack, a cylinder, a plane, or a horn. The lithium air battery may be applicable as a large battery for electric vehicles.

One or more embodiments will now be described in more detail with reference to the following examples. However, these examples are for illustrative purposes only and are not intended to limit the scope of the one or more embodiments.

EXAMPLES

Example 1

$Li_2CO_3$, $Al_2O_3$, MgO, $TiO_2$, and $(NH_4)_2HPO_4$ as precursors were weighed in appropriate amounts and in an appropriate mole ratio so as to obtain 0.03 moles of Powder 1 as a final product with the chemical formula in Table 1 below. In consideration of loss of $Li_2CO_3$ by volatilization, $Li_2CO_3$ was included in an excess of 10 mole %. The weighed precursors were mixed in a mortar, and were moved to an alumina crucible and then thermally treated at about 300° C. in air for about 12 hours (first pre-heating). After grinded in the mortar, the resulting product from the first preliminary-thermal treatment was moved to the alumina crucible and thermally treated at about 400° C. in air for about 1 hour (second pre-heating). The resulting product from the second preliminary-thermal treatment was calcined at about 900° C. for about 2 hours. The resulting powder was placed in a zirconia container for milling with zirconia balls and ethanol, and ground in a planetary mill at about 400 revolutions per minute ("RPM") for about 2 hours. The resulting product was dried at about 80° C. overnight to obtain Powder 1 as the final product.

Example 2

Powder 2 was synthesized in the same manner as in Example 1, except that a mole ratio of precursors was adjusted to obtain Powder 2 as a final product having the chemical formula in Table 1 below.

Example 3

Powder 3 was synthesized in the same manner as in Example 1, except that a mole ratio of precursors was adjusted to obtain Powder 3 as a final product having the chemical formula in Table 1 below.

Example 4

Powder 4 was synthesized in the same manner as in Example 1, except that a mole ratio of precursors was adjusted to obtain Powder 4 as a final product having the chemical formula in Table 1 below.

Comparative Example A

Powder A was synthesized in the same manner as in Example 1, except that a mole ratio of precursors was adjusted to obtain Powder A as a final product having the chemical formula in Table 1 below.

Comparative Example B

Powder B was synthesized in the same manner as in Example 1, except that a mole ratio of precursors was adjusted to obtain Powder B as a final product having the chemical formula in Table 1 below.

Comparative Example C

Powder C was synthesized in the same manner as in Example 1, except that a mole ratio of precursors was adjusted to obtain Powder C as a final product having the chemical formula in Table 1 below.

TABLE 1

| | | $Li_{1+x+2y}Al_xMg_yM_{2-x-y}(PO_4)_3$ | | |
|---|---|---|---|---|
| Example | Powder | x | y | Chemical formula |
| Example 1 | Powder 1 | 0.1 | 0.05 | $Li_{1.2}Al_{0.1}Mg_{0.05}Ti_{1.85}(PO_4)_3$ |
| Example 2 | Powder 2 | 0.2 | 0.05 | $Li_{1.3}Al_{0.2}Mg_{0.05}Ti_{1.75}(PO_4)_3$ |
| Example 3 | Powder 3 | 0.3 | 0.05 | $Li_{1.4}Al_{0.3}Mg_{0.05}Ti_{1.65}(PO_4)_3$ |
| Example 4 | Powder 4 | 0.2 | 0.1 | $Li_{1.4}Al_{0.2}Mg_{0.1}Ti_{1.7}(PO_4)_3$ |
| Comparative Example A | Powder A | 0.1 | 0 | $Li_{1.1}Al_{0.1}Ti_{1.9}(PO_4)_3$ |
| Comparative Example B | Powder B | 0.2 | 0 | $Li_{1.2}Al_{0.2}Ti_{1.8}(PO_4)_3$ |
| Comparative Example C | Powder C | 0.3 | 0 | $Li_{1.3}Al_{0.3}Ti_{1.7}(PO_4)_3$ |

Evaluation Example 1

Ion Conductivity Measurement of Powder

Powders of Examples 1 to 4 and Comparative Examples A to C were compressed into a disk shape having a diameter of about 12 millimeters (mm) through single-shaft compression molding. The resulting disc was thermally treated at about 900° C. in air for about 2 hours to obtain pellets for conductivity measurement. After forming Pt blocking electrodes each having a thickness of about 3000 Å or greater on opposite surfaces of each pellet, respectively, by sputtering, aluminum (Al) leads were connected to the Pt blocking electrodes, thereby forming conductivity cells. Conductivities of the conductivity cells were measured in an oven at varying temperatures using an alternating current (AC) impedance method at a frequency of about $0.1\sim1\times10^6$ Hertz (Hz) and at an amplitude of about 20 millivolts (mV). The results are shown in FIG. 5 (conductivities at a temperature of 0° C. to 80° C.) and in FIG. 6 (conductivities at room temperature).

Figure 5:
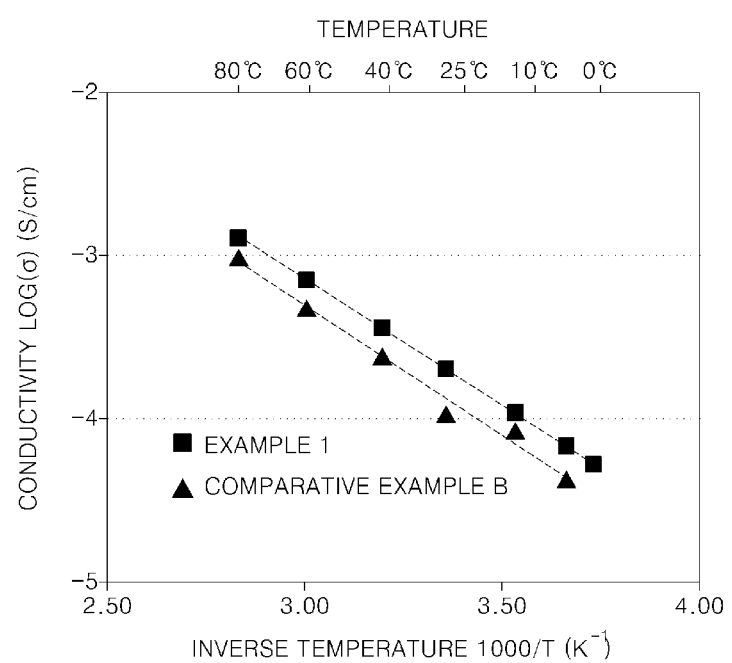
FIG. 5 is a graph of log conductivity (log σ, Siemens per centimeter, S/cm) versus temperature (° C.) and inverse temperature (1000/T, Kelvin$^{-1}$, (K$^{-1}$)) showing conductivity results for powders prepared in Example 1 and Comparative Example B.

Referring to FIGS. 5 and 6, the conductivities of Powders 1 to 4 of Examples 1 to 4 are found to be equal to or higher than those of Powders A to C of Comparative Examples A to C.

Evaluation Example 2

Identification of $Mg^{2+}$ Substitution Sites in Powder

Figure 7A:
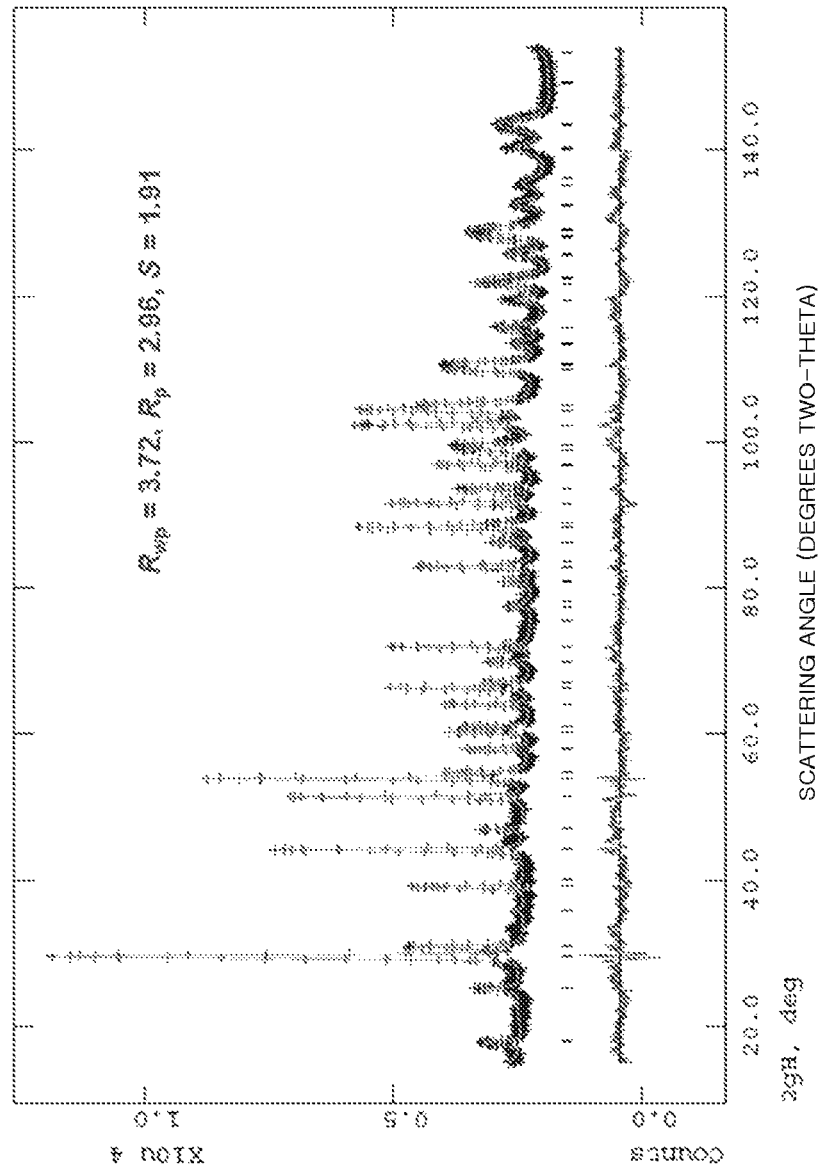
FIG. 7A is a graph of counts versus scattering angle (degrees two-theta) showing the results of neutron diffraction analysis of the powder prepared in Example 1.

Neutron diffraction analysis was performed on Powder 1 ($Li_{1.2}Al_{0.1}Mg_{0.05}Ti_{1.85}(PO_4)_3$) of Example 1, using a high-resolution powder diffractometer ("HRPD", available from Hanaro (Korea)) in a scan range of 0° to 159.95° (2 theta) at an incident beam wavelength of 1.834333 Å, in which a vanadium can was used as a sample holder. The results are shown in FIG. 7A. Rietveld refinement analysis of the neutral diffraction analysis results was performed. The results are shown in FIG. 7B. In FIG. 7B, X, Y, and Z are coordinates, and Fractn is the fractional occupancy.

Referring to FIGS. 7A and 7B, magnesium (Mg), like aluminum (Al), was identified at Ti sites (12C (0,0,Z)).

Evaluation Example 3

Li NMR Measurement

Solid-state $^7Li$ NMR spectra of Powder 1 ($Li_{1.2}Al_{0.1}Mg_{0.05}Ti_{1.85}(PO_4)_3$) of Example 1 and Powder B ($Li_{1.2}Al_{0.2}Ti_{1.8}(PO_4)_3$) of Comparative Example B were analyzed using a Bruker NMR 600 MHz system at a spin speed of 5 kHz to 25 kHz. The results are shown in FIG. 8.

Figure 8:
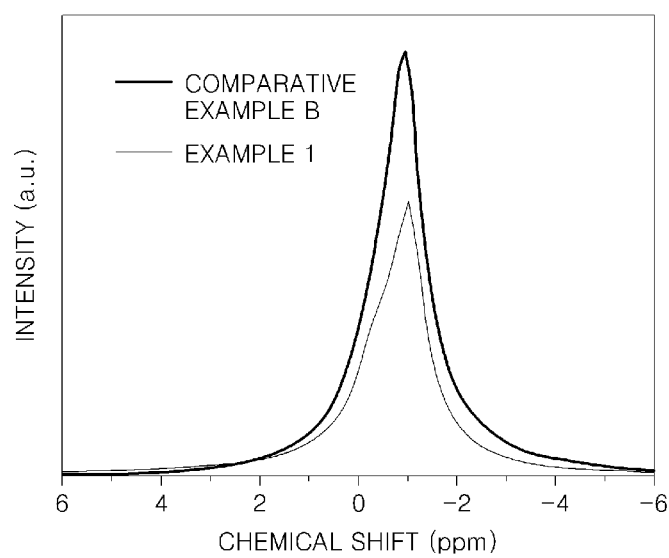
FIG. 8 is a graph of intensity (arbitrary units) versus chemical shift (parts per million, ppm) which illustrates a solid-state $^7$Li NMR spectrum of Powder 1 of Example 1 and Powder B of Comparative Example B.

Referring to FIG. 8, Powder B of Comparative Example B is found to have a symmetrical peak, while Powder 1 of Example 1 is found to have another peak adjacent to a main peak. This indicates that Powder 1 of Example 1 further includes another Li (for example, the interstitial second lithium 44 shown in FIG. 1) which is different from the first Li (for example, first lithium 42 in FIG. 1), due to $Mg^{2+}$ substituted at Ti sites of Powder 1. The results in FIG. 8 suggest that Powder 1 of Example 1 includes an increased amount of Li ions at the interstitial second lithium 44 site.

As described above, according to the one or more of the above embodiments, the lithium ion conductor provides improved conductivity, and thus a high-quality and improved lithium battery may be provided using the lithium ion conductor.

It should be understood that the exemplary embodiments described herein shall be considered in a descriptive sense only and not for purposes of limitation. Descriptions of features, advantages, or aspects within each embodiment should typically be considered as available for other similar features, advantages, or aspects in other embodiments.

What is claimed is:

1. A solid electrolyte comprising a lithium ion conductor represented by Formula 1:

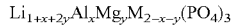    Formula 1 wherein, in Formula 1,
M comprises at least one of titanium (Ti), germanium (Ge), zirconium (Zr), hafnium (Hf), and tin (Sn), and $0<x\leq0.3$, and $0<y\leq0.1$, and
wherein the aluminum (Al) and the magnesium (Mg) of Formula 1 are substituted at a plurality of M sites of the lithium ion conductor of Formula 1, and
wherein M has an oxidation number of 4, which is constant during migration of lithium ions.

2. The solid electrolyte of claim 1, wherein M comprises at least one of titanium (Ti) and germanium (Ge).

3. The solid electrolyte of claim 2, wherein M is titanium (Ti).

4. The solid electrolyte of claim 1, wherein $0<y\leq0.05$.

5. The solid electrolyte of claim 1, wherein the lithium ion conductor is $Li_{1.2}Al_{0.1}Mg_{0.05}Ti_{1.85}(PO_4)_3$, $Li_{1.3}Al_{0.2}Mg_{0.05}Ti_{1.75}(PO_4)_3$, $Li_{1.4}Al_{0.3}Mg_{0.05}Ti_{1.65}(PO_4)_3$, or $Li_{1.4}Al_{0.2}Mg_{0.1}Ti_{1.7}(PO_4)_3$.

6. An electrode active material for a lithium battery, the electrode active material comprising:
a core comprising a material capable of intercalating and deintercalating lithium ions; and
a shell disposed on at least a portion of a surface of the core,
wherein the shell comprises the solid electrolyte comprising the lithium ion conductor of claim 1.

7. The electrode active material for a lithium battery of claim 6, wherein the lithium ion conductor is $Li_{1.2}Al_{0.1}Mg_{0.05}Ti_{1.85}(PO_4)_3$, $Li_{1.3}Al_{0.2}Mg_{0.05}Ti_{1.75}(PO_4)_3$, $Li_{1.4}Al_{0.3}Mg_{0.05}Ti_{1.65}(PO_4)_3$, or $Li_{1.4}Al_{0.2}Mg_{0.1}Ti_{1.7}(PO_4)_3$.

8. An all-solid-state lithium battery comprising:
a cathode including a cathode active material;
an anode including an anode active material; and
the solid electrolyte including the lithium ion conductor of claim 1.

9. The all-solid-state lithium battery of claim 8, wherein at least one of the cathode and the anode further comprises the solid electrolyte comprising the lithium ion conductor of claim 1.

10. The all-solid-state lithium battery of claim 8, wherein the lithium ion conductor is $Li_{1.2}Al_{0.1}Mg_{0.05}Ti_{1.85}(PO_4)_3$, $Li_{1.3}Al_{0.2}Mg_{0.05}Ti_{1.75}(PO_4)_3$, $Li_{1.4}Al_{0.3}Mg_{0.05}Ti_{1.65}(PO_4)_3$, or $Li_{1.4}Al_{0.2}Mg_{0.1}Ti_{1.7}(PO_4)_3$.

11. A lithium battery comprising:
a cathode including a cathode active material;
an anode including an anode active material; and
an organic electrolyte solution,
wherein at least one of the cathode, the anode, and the organic electrolyte solution further comprises the lithium ion conductor of claim 1.

12. The lithium battery of claim 11, wherein the lithium ion conductor is disposed in the cathode, and
the cathode has a layered structure including
a cathode current collector,
a cathode active material layer including the cathode active material, and
a protective layer comprising the lithium ion conductor,
wherein the cathode current collector, the cathode active material layer, and the protective layer are disposed sequentially upon one another.

13. The lithium battery of claim 11, wherein the lithium ion conductor is disposed in the cathode, and
wherein the cathode active material comprises:
a core including a material capable of intercalating and deintercalating lithium ions; and
a shell disposed on at least a portion of a surface of the core, wherein the shell comprises the lithium ion conductor.

14. The lithium battery of claim 11, wherein the lithium ion conductor is disposed in the anode, and
the anode has a layered structure including
an anode current collector,
an anode active material layer including the anode active material, and a protective layer comprising the lithium ion conductor,
wherein the anode current collector, the anode active material layer, and the protective layer are disposed sequentially upon one another.

15. The lithium battery of claim 11, wherein the lithium ion conductor is disposed in the anode, and
wherein the anode active material comprises:
a core including a material capable of intercalating and deintercalating lithium ions; and
a shell disposed on at least a portion of a surface of the core, wherein the shell comprises the lithium ion conductor.

16. A lithium air battery comprising:
a cathode comprising at least one of an oxygen-oxidation catalyst and an oxygen-reduction catalyst;
an anode including lithium;
an electrolyte disposed between the cathode and the anode; and
an ion conductive membrane disposed between the anode and the electrolyte,
wherein the ion conductive membrane comprises the lithium ion conductor of claim 1.

\* \* \* \* \*